F. G. KOLLENBERG.
LOCK WASHER.
APPLICATION FILED AUG. 3, 1908.
945,127.
Patented Jan. 4, 1910.
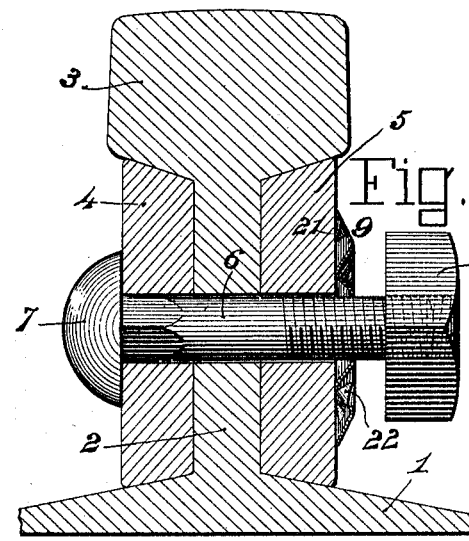
Fig. I.
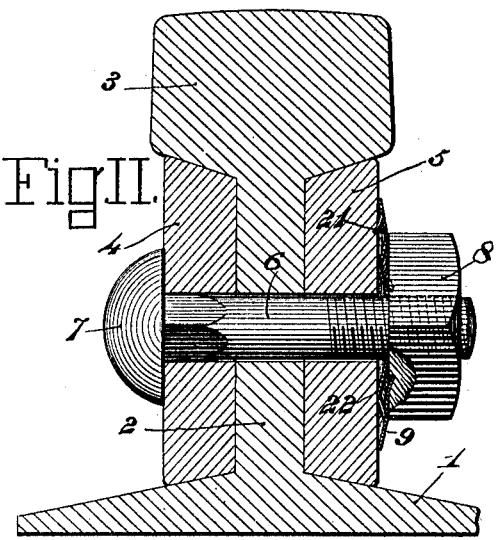
Fig. II.
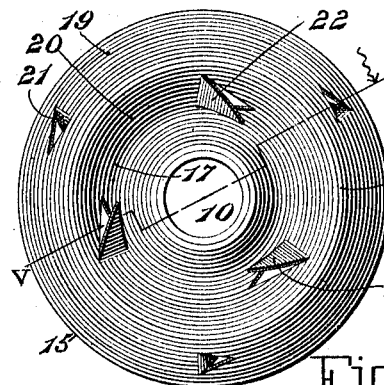
Fig. III.
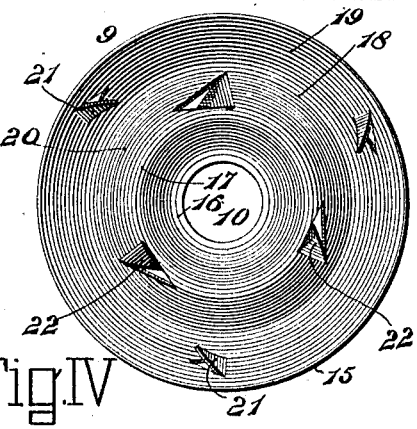
Fig. IV.
Fig. V.
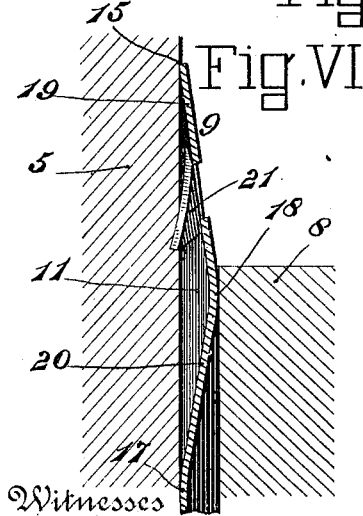
Fig. VI.
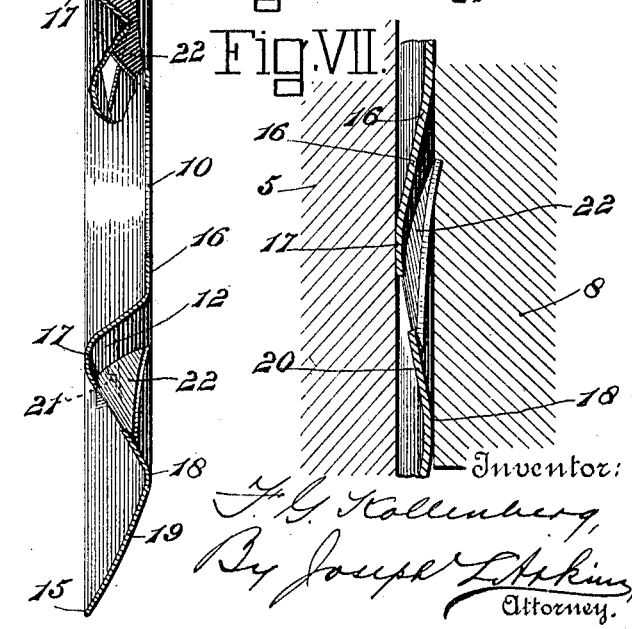
Fig. VII.
Witnesses
Harry King
M. H. Gates
Inventor:
F. G. Kollenberg,
By Joseph L. Atkins
Attorney.

UNITED STATES PATENT OFFICE.

FREDERICK G. KOLLENBERG, OF OWENSBORO, KENTUCKY, ASSIGNOR OF ONE-HALF TO THOMAS J. TURLEY, OF OWENSBORO, KENTUCKY.

LOCK-WASHER.

945,127.  Specification of Letters Patent.  Patented Jan. 4, 1910.

Application filed August 3, 1908. Serial No. 446,780.

*To all whom it may concern:*

Be it known that I, FREDERICK G. KOLLENBERG, of Owensboro, in the county of Daviess, State of Kentucky, have invented certain new and useful Improvements in Lock-Washers, of which the following is a specification.

The object of my invention is to produce an improved washer adapted to be applied about a bolt or the like, and to afford means for securing, without limit of adjustment, a nut upon the bolt.

An important feature of my invention consists in providing for the free rotation of the nut in its initial set against the washer, the locking action of the washer ensuing only upon substantial compression of the washer, and in providing in the washer a certain degree of resiliency in service, whereby accommodation is afforded to compensate for expansion and contraction, which in dead-set washers, particularly in railroad service, frequently results in separating the head from the bolt.

What constitutes my invention will be hereinafter specified in detail and succinctly set forth in the appended claims.

In the accompanying drawing, which constitutes a part of this specification, Figure I is a vertical section of a railroad rail and pair of fish-plates, showing in elevation a bolt passing through bolt-holes in the plates and web of the rail, a nut upon the end of the bolt, and my washer, in section, applied between the nut and the next adjacent fish-plate, the nut being out of contact with the washer, which is consequently presented in its normal shape. Fig. II is a view similar to Fig. I, showing the washer compressed by the nut into locking action by the screwing down of the nut against it. Fig. III is a plan view of my washer, detached, on somewhat enlarged scale, looking at it from its nut-engaging side. Fig. IV is a view similar to Fig. III, looking at it from the side opposite to that shown in Fig. III. Fig. V is a section on the line V—V of Fig. III on a magnified scale. Fig. VI is a fragmental view of a portion of the washer, showing it compressed, as in Fig. II, and illustrating in detail the engagement of an individual locking-member or tooth with the fish-plate. Fig. VII is a view similar to Fig. VI, showing the engagement of an individual locking-member or tooth with the nut.

Referring to the numerals on the drawing, 1 indicates the base of a rail, 2 the web thereof, and 3 the head.

4 indicates one fish-plate and 5 another, located, respectively, upon opposite sides of the web 2.

6 indicates a bolt provided with a head 7 and threaded at its end opposite to the head to accommodate a nut 8.

The members above described are presented to illustrate the method of employment of my device.

The invention itself consists of a preferably annular washer 9, which is provided with a bolt-hole 10, and whose diameter corresponds to the extent of the nut with which which it is designed to be employed, the washer being, in practice, made in different sizes to accommodate different sizes of nuts. The washer is made of yieldable sheet metal, preferably steel, to give it desirable resiliency and requisite hardness. It is provided on one side with an annular groove, channel, or corrugation, 11, and upon the opposite side with a like groove, channel, or corrugation, 12. The channels, as they are hereinafter designated for brevity, 11 and 12 are concentric with the bolt-hole 10 and define an outer circular edge 15, an inner face 16, and intermediate annular bends 17 and 18, the edge 15 and the bend 17, and the bend 18 and the face 16, respectively, being normally in the same plane, as clearly illustrated in Fig. V. The members 15 to 18, inclusive, define respectively, as stated, upon opposite sides of the washer, smooth bearing surfaces, against which the nut may turn at the moment of its initial operative contact with the washer. Through transverse compression of the washer, as when the nut 8 is screwed up toward the fish-plate 5 with sufficient force, the washer is flattened more or less, as shown, for example, in Figs. II, VI, and VII. Then, it is that the locking-members of the washer, hereinafter described, come into operative engagement with the members which effect the compression of the washer, that is to say, with specific reference to the members illustrated, the nut 8 and the plate 5.

The walls 19 and 20, which meet in the annular bend 18 and define the channel 11, carry, respectively, a series of locking-members, or teeth, 21 and 22. The said locking-members may be formed in any practicable manner upon their respective walls 19 and 20, and are preferably cut out and struck up from the metal of which the washer is made. In the normal shape of the washer, the points of the said locking-members are carried and as it were sheathed claw-like between the planes in which the bends 17 and 18, respectively, are located. Under compression of the washer, as above described, the angle of divergence between the walls 19 and 20 is increased, by diminution of the distance between the planes just referred to, and the locking-members 21 and 22, respectively, are thereby forced to project beyond those planes. The degree of projection of the locking-members and the force by which they are projected from opposite sides of the washer depend upon the force exerted to compress the washer. The locking-members 21 and 22, respectively, project in opposite directions, as illustrated. In consequence, the engagement of the locking-members 21 as with the fish-plate 5 tends to prevent the rotation of the washer, while the locking-members 22, due to their disposition and resiliency, act after the manner of the pawls of a ratchet to permit the turning of the nut 8 to drive it toward the bolt-head 7. Contrariwise, the locking-members 22 act like pawls to prevent the retreat of the nut upon its bolt. In this connection, it may be observed that the edge 15 coöperates with the locking-members 21 to confine the washer, after compression, immovably against the face of the fish-plate 5 or like member with which it is in engagement.

The operation of my invention having been described in the foregoing body of the specification, further description is deemed unnecessary.

What I claim is:

1. A metallic lock-washer consisting of an annular washer having a bolt hole, an inner face, a channel and bend on the same side of the washer and concentric with the bolt hole, a circular edge, a channel and a bend on the other side of the washer concentric with the bolt hole, the inner face and bend on one side of the washer being in the same plane and the circular edge and the bend on the other side of the washer being in the same plane, the washer being provided with locking members or teeth projecting from each side thereof in the channel.

2. A metallic lock-washer consisting of an annular washer having a bolt hole, an inner face, a channel and bend on the same side of the washer and concentric with the bolt hole, a circular edge, a channel and a bend on the other side of the washer concentric with the bolt hole, the inner face and bend on one side of the washer being in the same plane and the circular edge and the bend on the other side of the washer being in the same plane, the washer being provided with locking members or teeth projecting from each side thereof in the channel, the ends of these locking members and teeth being normally within the faces of the washer.

In testimony whereof I have hereunto signed my name in the presence of two subscribing witnesses.

FREDERICK G. KOLLENBERG.

Witnesses:
    MARVIN MAY,
    J. A. FRAYSER.